July 14, 1959 — PAI YEN LOUNG — 2,894,814
PURIFICATION OF TUNGSTATES
Filed Sept. 28, 1956 — 2 Sheets-Sheet 1

INVENTOR.
PAI YEN LOUNG
BY
W.D. Keith
ATTORNEY

July 14, 1959     PAI YEN LOUNG     2,894,814
PURIFICATION OF TUNGSTATES

Filed Sept. 28, 1956     2 Sheets-Sheet 2

INVENTOR.
PAI YEN LOUNG
BY
W. D. Keith
ATTORNEY

2,894,814
PURIFICATION OF TUNGSTATES

Pai Yen Loung, Glen Cove, N.Y., assignor to Wah Chang Corporation, New York, N.Y., a corporation of New York Application September 28, 1956, Serial No. 612,613

19 Claims. (Cl. 23—51)

This invention relates to the purification of tungsten by the removal of molybdenum, phosphorous, arsenic and other impurities and, more particularly, to the purification of tungsten by a complex recrystallization of an alkali metal paratungstate from normal alkali metal tungstate crystals.

In previous methods for the removal of impurities from tungstate by the crystallization of ammonium paratungstate, fractional separation has provided only 40 to 50% of the product sufficiently free of molybdenum impurity to meet standard specifications. Other methods of removal of molybdenum from tungsten are undesirable for various reasons. The use of alkali metal paratungstate in the purification of tungsten has heretofore provided only a small fractional separation and, therefore, has not been widely adopted.

It is an object of this invention to provide a method of purification of tungsten in which a high percentage of the product contains an extremely small percentage of molybdenum and other impurities.

It is another object of this invention to provide a method of treating tungsten solutions containing normal alkali metal tungstate so as to bring about a complex recrystallization of alkali metal paratungstate therefrom.

It is still another object of this invention to provide a method in the purification of normal alkali metal tungstate in which alkali metal paratungstate crystals are formed from a heated solution of normal alkali metal tungstate crystals.

Still another object of this invention is to provide a simple, effective and economical process for the separation of molybdenum, phosphorous, arsenic and similar impurities from an alkali metal tungstate.

Further and other objects of this invention will become more apparent upon consideration of the following description taken together with the accompanying drawings in which.

According to the present invention, paratungstate crystals of an alkali metal are produced by crystallization from a solution containing the normal alkali metal tungstate and the paratungstate and sodium chloride in mutual solubility.

As a further feature of this invention, the treated tungstate may be purified by the removal of phosphorous upon heating and hot filtering the tungstate solution at an adjusted alkaline pH. The removal of the phosphorous and arsenic impurities is achieved by the crystallization of the alkali metal tungstate from a solution containing a suitable amount of alkali metal hydroxide, upon heating and hot filtering the tungstate crystals in the adjusted alkaline solutions. The tungstate solution in this part of the process of this invention must have a hydroxide concentration above 0.1 N ranging up to about a 15% solution. The pH of the tungstate solution before the removal of phosphorus is preferably around pH 13. An alkalinity of over pH 13 is permissible providing that the phosphorous impurity does not form a precipitate in the solution. The removal of these phosphorous or arsenic compounds is separately claimed in my co-pending application Serial No. 696,929, filed November 18, 1957, which is a continuation-in-part of my copending U.S. application Serial No. 466,274, filed November 2, 1954.

The process of this invention provides forming of a normal alkali metal tungstate crystal into a paste having a low alkalinity which is heated and acidified to a pH of 7 to 7.5 to produce a mutual solubility of tungstate, paratungstate and salt in a clear solution followed by further acidification to a pH range of 6 to 6.9 so as to bring about the deposit of crystals of paratungstate and the continued production of paratungstate crystals upon cooling of the solution, preferably to below 10° C. Upon removal of the mother liquor a high conversion of from 80% to 93% of the tungstate to paratungstate crystals is achieved with a removal of a substantial proportion of the molybdenum of the tungstate. This process may be repeated by further treatment of the mother liquor to provide second and third crystallizations of the paratungstate crystals.

The pH of the normal sodium tungstate crystals in partial solution at the inception of the process of this invention is preferably below pH 13. If the pH is more alkaline an excess of acid salt may be produced during the complex recrystallization of the process.

Figure 1:
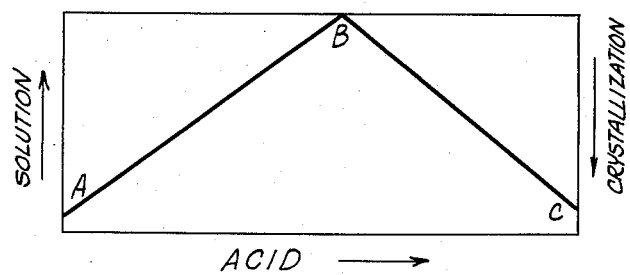
Figure 1 is a graph showing the relative crystallinity and solubility of an alkali metal tungstate and paratungstate as treated according to this invention.

The complex recrystallization of this invention provides a chemical change of the crystals of a normal alkali metal tungstate through mutual solubility with the paratungstate into the crystals of the alkali metal paratungstate with the impurities remaining in the mother liquor. The main factors influencing the mutual solubility of the normal tungstate, paratungstate and salts are the chemical reaction between the tungstate and the reagents, the length of the time of the purification operation, the temperature of the reacting compounds during the reaction and finally, the decomposition of the alkali metal paratungstate into undesired components at high temperatures. The higher the temperature the greater the mutual solubility of the normal tungstate, paratungstate and the salts and consequently the more complete will be the chemical reaction. The limiting factor on the temperature of reaction is the decomposition of the paratungstate into undesired components such as metatungstate. An efficient reaction is obtained at temperatures of about 80° C. and above. Temperatures above 100° C. are undesirable. Consequently, a range of temperatures of reaction of from about 80° C. to below 100° C. are best for the operation of the invention. The role of the mutual solubility of the normal alkali metal tungstate, paratungstate and alkaline and alkaline earth salts in the complex recrystallization and formation of the paratungstate product of this invention, is diagrammatically illustrated in Figure 1. In Figure 1 a graph is shown illustrating the relative solubility and crystallinity of the tungstate compounds of an alkali metal in a solution of this invention. The upward pointing arrow indicates increasing solubility of the compound in the solution and the downward pointed arrow represents increasing crystallization of the tungstate compound in solution. On the abscissa axis, from left to right indicates increasing acidity of the solution. The broken line curve ABC charts the changes in the tungstate compound. Point A indicates the normal alkali metal tungstate crystals having a relatively high molybdenum content partly dissolved in a small amount of water. Point B indicates a clear solution of the normal tungstate, the paratungstate and acid salt and point C indicates predominant crystals of the paratungstate containing a relatively small amount of molybdenum.

The removal of molybdenum by the process portrayed in Fig. 1 may not provide a tungstate product sufficiently free of molybdenum for commercial purposes. This is particularly the case when the original normal tungstate has a high molybdenum content. A process for the further removal of molybdenum from the paratungstate is shown in Figures 2A and 2B.

Figure 2A:
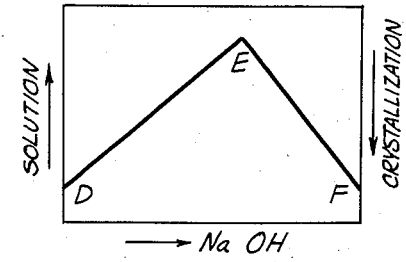
Figure 2A is another graph portraying the relative crystallinity and solubility of an alkali metal paratungstate and alkali metal tungstate and the transformation of the paratungstate crystals to tungstate crystals according to this invention.

Figure 2A is a graph depicting the relative solubility and crystallinity of the alkali metal paratungstate and normal tungstate in a range of alkaline solutions. The relatively solubility and crystallinity is shown on the ordinate axis ranging from crystallinity at the abscissa axis to increasing solubility upwardly of the ordinate axis. The abscissa axis of the graph in the left-to-right progression indicates increasing alkalinity of the slurry. The graph indicates a progression from paratungstate crystals to solubility, to recrystallization as normal tungstate. Point D indicates crystallized paratungstate with high molybdenum content partially dissolved in a small amount of water. Point E indicates a high point of mutual solubility of normal tungstate and paratungstate without acid salt heated to a temperature sufficient to provide the mutual solubility which is generally below 80° C. Point F indicates crystallized normal tungstate partially dissolved and containing high molybdenum content.

Figure 2B:
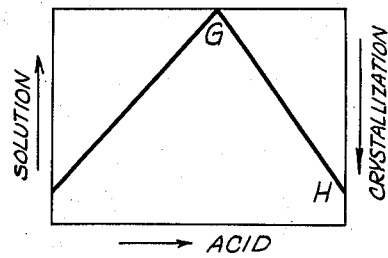
Figure 2B is a graph depicting the relative crystallinity and solubility of an alkali metal tungstate and paratungstate according to this invention and the transformation of the alkali metal tungstate crystals to paratungstate crystals according to this invention.

Figure 2B shows a graph of the relative solubility and crystallinity of the normal tungstate and paratungstate in an acid solution. The relative solubility and crystallinity is shown on the ordinate axis similarly to the graph of Figure 2A. Increasing acidity is indicated in the left-to-right progression on the abscissa axis of the graph. The graph indicates a progression of the alkali metal tungstate from normal tungstate crystallinity to mutual solubility with the paratungstate and acid salt to recrystallization as the paratungstate. Point G indicates a clear solution of the normal sungstate, paratungstate and acid salt at a temperature in the range of the reaction of this invention, as described above. Point H indicates recrystallized paratungstate with low molybdenum content.

Figs. 1, 2A and 2B thus graphically present the effect of acidification and alkalizing on the crystalline structure of normal alkali metal tungstate and alkali metal paratungstate compounds.

Figure 3:
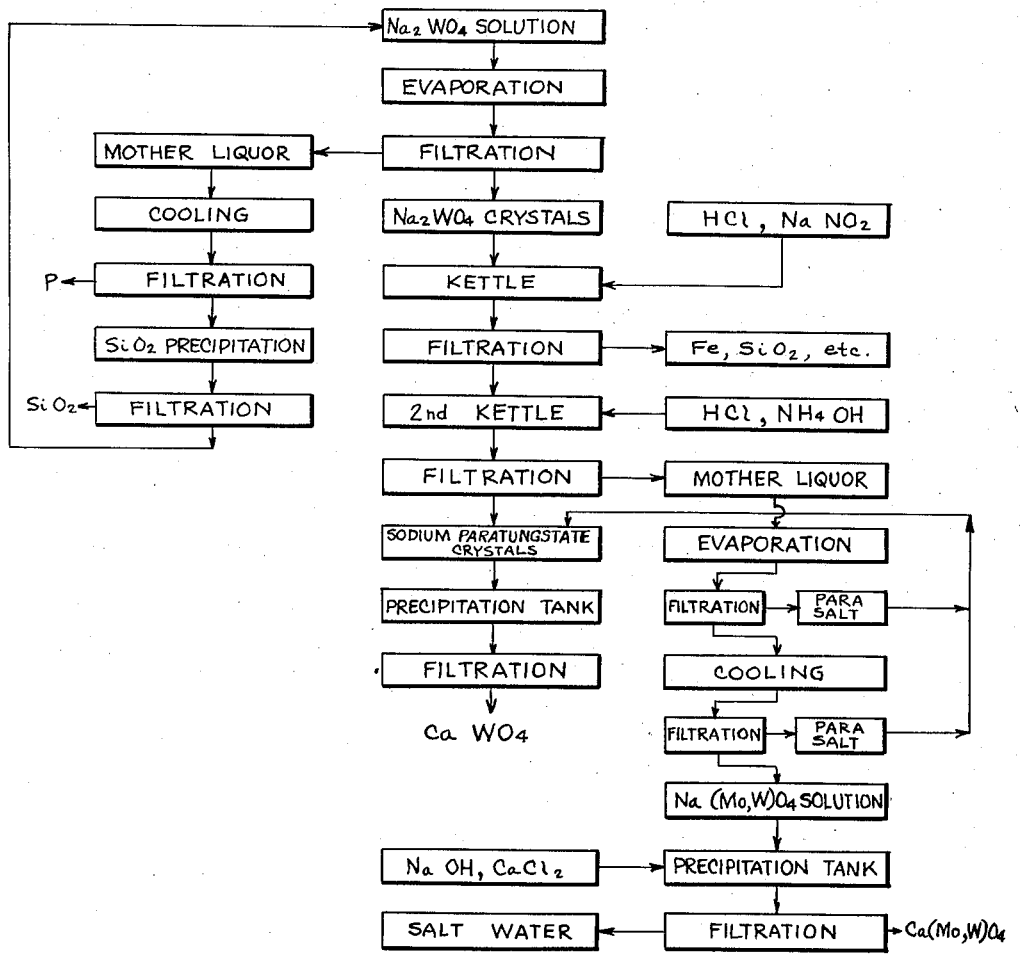
Figure 3 is a flow diagram of a purification process according to this invention.

For the purpose of description a series of purification steps are illustrated in the flow sheet diagram of Fig. 3. The step-wise treatment of one of the alkali metal tungstates is shown in the flow sheet. In Figure 3, the flow sheet diagrammatically shows a starting solution of normal sodium tungstate. The tungstate solution is evaporated and hot filtered to provide a product of sodium tungstate crystals and a mother liquor. The sodium tungstate crystals are then successively heated and acidified to a controlled pH, filtered, heated again and acidified to a controlled pH to produce sodium paratungstate crystals. Suitable acids and alkalis are appropriately added to adjust the pH to a range of 6 to 6.9. The mother liquor is removed from the sodium paratungstate crystals, by suitable means such as filtration or centrifugation. The sodium paratungstate crystals are treated with an alkaline calcium chloride solution to form calcium tungstate which is removed from the hot water by filtration providing a final purified product of calcium tungstate.

The mother liquor removed from the sodium tungstate crystals, is treated by the addition of water followed by cooling to a range of about 0° C. to 5° C. to bring about the crystallization of trisodium-orthophosphate. The orthophosphate crystals are removed by filtration to provide a mother liquor containing a phosphorous percentage of the order of the original sodium tungstate solution. Silica may then be removed by the precipitation of silica with lime and filtration of the mother liquor. The adjusted mother liquor may then be returned to the initial process stage for heating in an adjusted alkaline condition for the further precipitation of sodium tungstate crystals.

The mother liquor from the filtration of the sodium paratungstate crystals is suitably reprocessed by evaporation and filtration to provide sodium paratungstate crystals followed by cooling to produce additional sodium paratungstate crystals from the mother liquor. This crop of sodium paratungstate crystals is mixed with the first mentioned sodium paratungstate crystals for conversion to calcium tungstate. The remaining solution after removal of the second crop of sodium paratungstate crystals is treated for the recovery of the molybdenum and the balance of the tungstate by the addition of a solution of calcium chloride and sodium hydroxide to precipitate calcium tungstate and calcium molybdate from the salt water solution. The precipitate is removed from the salt water by filtration and becomes a byproduct.

This second crystallization of sodium paratungstate may account for 3 to 10% of the original tungsten trioxide and may contain as high a molybdenum content as the original normal sodium tungstate crystals. To purify this second crop of sodium paratungstate crystals they may be processed in accordance with the procedure described in connection with Figures 2A and 2B and the product thereof mixed with the first crop of paratungstate crystals.

The other alkali metal tungstates may similarly be purified according to this invention by solution, evaporation, hot filtering, heating, acidification, filtering, reheating, and acidification to produce the purified paratungstate crystals. The separation of molybdenum from tungsten may be effected according to this invention with the treatment of an alkali metal tungstate according to this invention, as best described in the following examples, of the purification of specific alkali metal tungstates.

In the tables in each of the following examples the two columns under Assay, indicate the relative percentages of tungsten trioxide, referred to herein as trioxide and molybdenum in each of the respective products and the columns under Distribution indicate the percentage of the total amount of tungsten and molybdenum of the original crystals in each of the products.

For the purpose of further illustration of the process of this invention the following examples are set forth to more particularly describe the process without limitation upon the scope of the invention.

EXAMPLE I 1360 grams normal sodium tungstate crystallized from a solution of low alkalinity was wetted with 900 cubic centimeters of water, stirred well, heated to 80° C., acidified to pH 6.5, cooled in cold water to about 20° C., filtered and first sodium paratungstate obtained. The mother liquor was evaporated to two-thirds of its volume, filtered hot to remove salt, then cooled overnight to about 17° C., and second sodium paratungstate obtained. The following Table 1 sets forth the results:

Table 1

|  | Assay | | Distribution | |
| --- | --- | --- | --- | --- |
|  | WO₃ | Mo | WO₃, Percent | Mo, Percent |
| Na₂WO₄ crystals, 1,360 grams | 67.33% | 0.42% | | |
| First para, 981 grams | 79.29% | 0.06% | 85.29 | 11.22 |
| Salt, 118 grams | 5.02% | 0.13% | 0.65 | 2.80 |
| Second para, 60 grams | 72.01% | 0.30% | 4.74 | 3.37 |
| Mother liquor, 470 cc | 181 gm/l | 9.4 gm/l | 9.32 | 82.62 |

It is to be noted that the first crop of sodium paratungstate crystals had a conversion of over 80% tungstate and over 88% of the molybdenum in the original sodium tungstate crystals was eliminated from this first crop. The total product of the purification of this Example I produced 1159 grams of sodium paratungstate containing 71.35% of trioxide and 0.08% of molybdenum impurity. Consequently, 90.68% of the trioxide was converted to sodium paratungstate with an elimination of 82.62% molybdenum.

EXAMPLE II 200 grams normal sodium tungstate crystallized from strongly alkaline solution was wetted with 200 cubic centimeters of water, treated as in Example I, and first sodium paratungstate crystals obtained. Now, to the mother liquor 100 grams more of sodium tungstate crystals were added then the treatment repeated to obtain second sodium paratungstate. The following Table 2 sets forth the results:

Table 2

|  | Assay | | Distribution | |
|---|---|---|---|---|
|  | $WO_3$ | Mo | $WO_3$, Percent | Mo, Percent |
| $Na_2WO_4$ crystals, 300 grams. | 75% | 0.68% |  |  |
| First para, 155 grams | 79.92% | 0.07% | 58.91 | 7.97 |
| Second para, 124 grams | 59.20% | 0.15% | 34.92 | 13.77 |
| Mother liquor, 100 cubic centimeters. | 129.9 gm/l | 10.8 gm/l | 6.17 | 78.26 |

Thus in this example the conversion of tungsten to sodium paratungstate was 93.83% with the elimination of 78.26% of the molybdenum in the original sodium tungstate crystals. In this example, the second group of sodium paratungstate crystals was diluted with salt due to the omission of the hot filtration step. The total sodium paratungstate product of this example was 279 grams with a conversion of 93.83% of the tungsten to sodium paratungstate and elimination of 78.26% of the molybdenum in the original sodium tungstate crystals.

EXAMPLE III 858 grams of sodium paratungstate crystals made from sodium tungstate crystals having a trioxide to molybdenum ratio of 100 to 3 and containing 78.88% tungstate and 0.43% molybdenum were wetted with 700 cubic centimeters of water, stirred well, heated to 80° C. to form a solution with normal sodium tungstate and sodium paratungstate in mutual solubility. 130 grams of sodium hydroxide were added to the sodium paratungstate slurry. Normal sodium tungstate crystals were formed having the tungsten trioxide to molybdenum ratio lower than 100 to 3 on cooling of the solution. The normal sodium tungstate crystals were neutralized and partially dissolved in a slurry. The slurry was then heated to 80° C., acidified to pH 6.5, cooled in cold water to about 20° C., filtered to provide a crop of sodium paratungstate crystals. The mother liquor from the filtration was evaporated to two-thirds of its volume, further filtered to remove salt, then cooled overnight to about 17° C. to provide a second crop of sodium paratungstate crystals. The following Table 3 presents the results:

Table 3

|  | Assay | | Distribution | |
|---|---|---|---|---|
|  | $WO_3$ | Mo | $WO_3$, Percent | Mo, Percent |
| Original para, 858 grams | 78.88% | 0.43% |  |  |
| First para, 800 grams | 78.30% | 0.06% | 93.77 | 12.94 |
| Salt, 206 grams | 8.92% | 0.31% | 2.75 | 17.25 |
| Second, para, 30 grams | 49.70% | 0.50% | 2.23 | 4.04 |
| Mother liquor, 56 cubic centimeters. | 147.6 gm/l | 43.6 gm/l | 1.23 | 65.77 |

In this example the total conversion of tungsten in the recrystallization of paratungstate was 96% with an elimination of 83.02% of the molybdenum in the original sodium paratungstate crystals.

EXAMPLE IV 6 liters of $Na_2WO_4$ solution obtained from acid digestion of scheelite ore, containing approximately 300 grams $WO_3$ per liter and 2–3 grams Mo per liter, was first evaporated to 2500 cubic centimeters with substantial crystallization of sodium tungstate, then acidified to pH 6.5, and a little $NH_4OH$ added to adjust the pH automatically for para, cooled and filtered. The filtrate was futher evaporated and filtered hot to remove salt, then cooled and filtered. The filtrate was once more evaporated and filtered hot. Table 4 presents the results:

Table 4

|  | Assay | | Distribution | |
|---|---|---|---|---|
|  | $SO_3$ | Mo | $WO_3$, percent | Mo, percent |
| $Na_2WO_4$ solution, 6,000 cubic centimeters (calculated). | 295.12 gm./l | 2.52 gm./l |  |  |
| First para, 1,742 grams | 82.68% | 0.12% | 81.34 | 13.82 |
| Salt, 356 grams | 6.12% | 0.24% | 1.23 | 5.62 |
| Second para, 224 grams | 70.86% | 0.18% | 8.97 | 2.65 |
| Third para, 168 grams | 36.35% | 1.55% | 3.45 | 17.20 |
| Mother liquor, 530 cubic centimeters. | 167.56 gm./l | 17.33 gm./l | 5.01 | 60.71 |

90.13% of the trioxide of this example is converted to sodium paratungstate in the first and second crops of this example and the molybdenum elimination in these examples is 83.53%. The third group of sodium paratungstate crystals of this example was discarded and combined with the salts and the mother liquor.

EXAMPLE V 454 grams of normal potassium tungstate crystals, containing 69% tungsten trioxide and 0.63% molydenum and, with less than 0.01% phosphorus, arsenic and silicon dioxide were wetted with 250 cubic centimeters of water, stirred well and heated to 80° C. 5 grams of sodium nitrate were added and the slurry acidified to a pH of 6.5. A small amount of ammonium hydroxide was added to adjust the pH to 6.9. The slurry was cooled in cold water to about 20° C., filtered and the crystals were slightly washed with water to provide potassium paratungstate crystals. The following Table 5 presents the results:

Table 5

|  | Assay | | Distribution | |
|---|---|---|---|---|
|  | $WO_3$ | Mo | $WO_3$, percent | Mo, percent |
| $K_2WO_4$ crystals, 454 grams | 69.00% | 0.63% |  |  |
| Potassium para, 347 grams | 82.45% | 0.08% | 91.33 | 10.84 |
| Mother Liquor, 310 cc | 87.61 g./l | 8.22 g./l | 8.67 | 89.16 |

It is to be noted that starting with otherwise highly pure $K_2WO_4$ crystals containing only a trace of phosphorus, arsenic and silicon dioxide, the recovery of potassium paratungstate is over 91% without any evaporation. The absence of impurities other than molybdenum in the starting crystals is an importace factor in the purity of the product of this example.

Normal ammonium tungstate decomposes and can not be produced from a solution by crystallization. Accordingly, in purifying the ammonium tungstate the ammonium tungstate is converted to sodium or potassium tungstate for its purification by removal of the molybdenum according to the process of this invention.

EXAMPLE VI 454 grams of ammonium paratungstate crystals, containing 89.14% tungsten trioxide and 0.53% molybdenum were wetted with 250 cubic centimeters of water, stirred well and heated to 90–100° C. The slurry was treated with 50% NaOH solution to alkalize the slurry to a pH of 12. 5 grams of sodium nitrate were added and the slurry acidified to a pH of 6.4. A small amount of ammonium hydroxide was added to adjust the pH to 6.9. The slurry was cooled in cold water to about 20° C. and filtered. The crystal product was slightly washed with water, and sodium paratungstate crystals were recovered. The following Table 6 presents the results:

*Table 6*

|  | Assay | | Distribution | |
|---|---|---|---|---|
|  | $WO_3$ | Mo | $WO_3$, percent | Mo, percent |
| Ammonium para, 454 grams. | 89.14% | 0.53% | | |
| Sodium para, 469 grams | 79.46% | 0.07% | 92.03 | 13.69 |
| Mother Liquor, 320 cc | 100.78 g./l. | 6.50 g./l. | 7.97 | 86.31 |

The above examples relate to the purification of alkali metal tungstate by recrystallization through the mutual solubility of normal alkali metal tungstate and the alkali metal paratungstate salt.

The following examples relate to the purification by the removal from sodium tungstate crystals of phosphorus and other impurities by hot filtering at a controlled alkaline pH.

EXAMPLE VII 3 liters of sodium tungstate solution, with pH of about 14, obtained from acid digestion of Korean scheelite not previously acid leached to remove phosphorus then treated with NaOH, was first evaporated to about one-half of its original volume, filtered hot, and first crop of sodium tungstate crystals obtained. Acid was then added to keep the pH at 14, and the operation repeated to obtain the second, third and fourth crops of sodium tungstate crystals. The last filtrate was cooled to room temperature with water, and a mixture of crystals containing tungsten and phosphorus obtained. Table 7 presents the results:

*Table 7*

|  | Assay | | Distribution | |
|---|---|---|---|---|
|  | $WO_3$ | P | $WO_3$, percent | P, percent |
| Sodium tungstate solution (Head calculated) 3000 cc. | 350.37 gm./l. | 0.49 gm./l. | 100 | 100 |
| 1st $Na_2WO_4$ crystals, 336 gms. | 76.81% | 0.01% | 24.56 | 2.04 |
| 2nd $Na_2WO_4$ crystals, 675 gms. | 75.13% | 0.04% | 48.25 | 18.37 |
| 3rd $Na_2WO_4$ crystals, 263 gms. | 74.80% | 0.04% | 18.72 | 7.48 |
| 4th $Na_2WO_4$ crystals, 95 gms. | 59.15% | 0.08% | 5.35 | 5.44 |
| Mixed W-P crystals, 28 gms. | 48.13% | 3.07% | 1.28 | 57.83 |
| Mother liquor, 150 cc. | 129.44 gm./l. | 0.86 gm./l. | 1.84 | 8.84 |

The high tungsten content in the mixed tungsten and phosphorous crystals is accounted for by the filtration of the fourth crop of crystals without adding water. Similarly the phosphorus in the mother liquor is a high value because of insufficient cooling before the final filtration step. The total trioxide percentage in the 1369 grams of sodium tungstate crystals product is 74.37% against 0.036% of phosphorus to provide a 66.67% of phosphorus elimination from the original sodium solution.

EXAMPLE VIII 3 liters of sodium tungstate solution with pH of about 14 obtained from acid digests of Korean scheelite not previously acid leached to remove phosphorus and then treated with NaOH was first evaporated to two-thirds of its original volume, then successively to one-third, then one-fifth of the original volume, cooled at 5° C., evaporated to about one-tenth of the original volume, filtered after each step. Table 8 presents the results:

*Table 8*

|  | Assay | | Distribution | |
|---|---|---|---|---|
|  | $WO_3$ | P | $WO_3$, percent | P, percent |
| Sodium tungstate solution (Head calculated), 3,000 cc. | 365.32 g./l. | 0.57 g./l. | 100 | 100 |
| 1st $Na_2WO_4$ crystals, 600 gms. | 77.22% | 0.05% | 42.28 | 17.65 |
| 2nd $Na_2WO_4$ crystals, 693 gms. | 75.38% | 0.04% | 47.66 | 16.47 |
| 3rd $Na_2WO_4$ crystals, 76 gms. | 69.32% | 0.05% | 4.81 | 2.35 |
| 4th $Na_2WO_4$ crystals, 27 gms. | 52.07% | 3.71% | 1.28 | 58.82 |
| 5th $Na_2WO_4$ crystals, 35 gms. | 61.83% | trace | 1.97 |  |
| Mother liquor, 180 cc. | 121.56 g./l. | 0.45 g./l. | 2.00 | 4.71 |

With the fourth group of sodium tungstate crystals produced by this example, eliminated, the total sodium tungstate crystal production was 1404 grams with 0.044% of phosphorus to give a 96.72% recovery of trioxide from the original sodium tungstate solution and a 63.53% elimination of phosphorus. As described above in connection with the flow sheet, the mother liquor may be recycled.

This invention is concerned with the treatment of alkali metal tungstate crystals and is not limited to the treatment of only some members of the alkali metal group. Also the invention is not limited solely to the treatment of normal alkali metal tungstate crystals. As indicated in Examples VII and VIII the processes may be started with sodium tungstate solution or tungstic acid. As described in Example 6 the starting material is ammonium paratungstate, which as described above, can not be produced from a solution by crystallization. Accordingly, the ammonium paratungstate is converted to sodium or potassium paratungstate. With a starting material of tungstic acid the acid is converted to sodium tungstate solution by sodium hydroxide.

The normal sodium tungstate solution should be evaporated to a concentration of about 1000 grams of trioxide per liter. At this concentration the tungstate will be at least half in crystalline form. This mixture of crystals in solution is acidified according to the process, as described above, to produce sodium paratungstate crystals. In carrying out the process of this invention from sodium tungstate solution, care must be taken to provide a starting solution with a low concentration of sodium hydroxide to control or limit the production of acid salt and also to avoid inclusion of impurities such as phosphorus and arsenic with the paratungstate crystals.

Among other advantages of the process of this invention are the high conversion and high recovery of tungstate in comparison to the high elimination of impurities such as molybdenum and phosphorus. A further advantage is found in the economy of the added reagents. The process of this invention consequently is economical and efficient. Further advantages are found in the absence of corrosive solutions. A large percentage of the operations are conducted around a neutral pH, and all operations are conducted under neutral or alkaline conditions. Further the process does not involve or produce objectionable substances and the sole waste product is common salt.

Finally, the economy of the operation provides further advantages. The process of this invention can be carried through a large number of steps and consequently can employ low grade starting materials. For example, this process can treat such a high molybdenum ore as one having a tungsten trioxide to molybdenum ratio of 100 to 3 or higher. Also the re-treatment allows repetition of the purification to any degree of refinement.

It will be readily understood that the above noted description, with its examples, and illustrations, is for the purpose of illustration only and that this invention is limited solely by the scope of the appended claims.

This application is a continuation-in-part of my copending United States application Serial No. 466,274, filed November 2, 1954, for "Purification of Tungsten," now abandoned.

I claim:

1. In a process of treating tungsten compounds to reduce the molybdenum impurity content thereof, the steps comprising forming the tungsten values into an alkaline mixture of a saturated solution of alkali metal tungstate and undissolved crystals of alkali metal tungstate, lowering the alkalinity of said mixture to form a substantially clear solution of alkali metal paratungstate and alkali metal tungstate, thereafter acidifying said solution to a feebly acid state to induce precipitation therefrom of tungsten values in the form of alkali metal paratungstate crystals and removing said paratungstate crystals from the residual solution.

2. The process of claim 1 in which the alkali metal component of the named compounds is sodium.

3. The process of claim 1 in which the alkali metal component of the named compounds is potassium.

4. In a process of treating tungsten compounds to reduce the molybdenum impurity content thereof the steps comprising processing the tungsten values into an alkaline mixture of a saturated solution of alkali metal tungstate and undissolved crystals of alkali metal tungstate, reducing the alkalinity of said mixture to a pH of 7 to 7.5 and dissolving the crystals of said mixture, acidifying the resultant solution to a pH of 6 to 6.9 to induce formation of alkali metal paratungstate crystals.

5. The process of claim 4 in which the alkali metal component of the named compounds is sodium.

6. The process of claim 4 in which the alkali metal component of the named compounds is potassium.

7. The process of claim 4 in which the precipitation of the alkali metal paratungstate crystals is further induced by cooling the said resultant solution to temperatures of below about 21 degrees centigrade.

8. The process of claim 7 in which the alkali metal component of the named compounds is sodium.

9. The process of claim 7 in which the alkali metal component of the named compounds is potassium.

10. The process of claim 4 in which said mixture is heated to temperatures within the range of about 80 to about 100 degrees centigrade.

11. The process of claim 10 in which the alkali metal component of the named compounds is sodium.

12. The process of claim 10 in which the alkali metal component of the named compounds is potassium.

13. In the purification of normal alkali metal tungstates by the removal of molybdenum, the steps of forming a mixture of normal alkali metal tungstate and a molybdenum impurity in water in a concentration in excess of the solubility product of the normal alkali metal tungstate in water at an alkaline pH and room temperature, acidifying said mixture to a pH range of 7 to 7.5, heating said acidified mixture to a temperature between 80° C. and 100° C., forming a solution of alkali metal paratungstate, alkali metal tungstate and molybdenum impurity, acidifying said solution to a pH of 6 to 6.9 and cooling said solution to a temperature of at least 20° C.

14. The method of removing molybdenum from sodium tungstate which comprises the recrystallization of normal sodium tungstate crystals to sodium paratungstate crystals by forming a solution of sodium tungstate and sodium tungstate crystals, acidifying said solution and crystals to a pH of 7 to 7.5, forming a sodium paratungstate from said sodium tungstate crystals and a solution containing said normal sodium tungstate, sodium paratungstate and molybdenum in mutual solubility and crystallizing sodium paratungstate from said solution of mutual solubilities by acidification to a pH of 6 to 6.9.

15. A process of removing molybdenum from sodium paratungstate crystals which comprises partially dissolving said sodium paratungstate crystals in an alkaline solution, increasing the alkalinity of said solution to increase the solubility of said sodium paratungstate crystals therein to produce a solution of normal sodium tungstate containing normal sodium tungstate crystals, subsequently acidifying said crystals to a pH range of 7 to 7.5 to dissolve said normal sodium tungstate crystals, producing solubilized sodium paratungstate in mutual solution with normal sodium tungstate and molybdenum, and finally acidifying said solution to a pH in the range of 6 to 6.9 to produce recrystallization of sodium paratungstate with reduced molybdenum content and removing said molybdenum in said solution.

16. A process for preparing sodium paratungstate crystals which comprises dissolving normal sodium tungstate crystals containing molybdenum in a slightly alkaline solution to provide a saturated solution and slurry of undissolved crystals, heating said normal sodium tungstate solution and slurry to about 80° C., acidifying said heated solution and said tungstate to bring about complete dissolution of said tungstate in said solution, further acidifying said solution to a pH in the range of 6 to 6.9, and cooling said solution to about 20° C., to produce over 90% of the tungstate of the normal sodium tungstate as sodium paratungstate crystals with substantially reduced molybdenum content.

17. A process of removing molybdenum impurities from a sodium tungstate compound which comprises forming a mixture of a saturated solution and slurry of undissolved crystals of a sodium tungstate at an alkaline pH, acidifying said slurry and solution mixture to a pH range of 7 to 7.5 and heating said mixture to a temperature between 80° C. and 100° C. to dissolve said tungstate crystals, acidifying said solution to a pH between 6 and 6.9 to form paratungstate crystals of said sodium tungstate compound, cooling said solution to produce additional paratungstate crystals and removing the residual impurities-containing solution from said precipitated crystals.

18. In a process as claimed in claim 17 cooling to below 17° C.

19. In a process as claimed in claim 17 cooling to below 10° C.

References Cited in the file of this patent

UNITED STATES PATENTS

Mellor: "A Comprehensive Treatise on Inorganic and Theoretical Chemistry," vol. 11, page 687. Longmans, Green and Co., New York, 1931.

Li et al.: "Tungsten," pages 181–183, 201, 202, Reinhold Publishing Corp., New York, 1947.